United States Patent
Roeger-Goepfert et al.

(10) Patent No.: US 9,834,677 B2
(45) Date of Patent: Dec. 5, 2017

(54) COMPOSITION FOR METAL ELECTROPLATING COMPRISING LEVELING AGENT

(75) Inventors: Cornelia Roeger-Goepfert, Schwetzingen (DE); Roman Benedikt Raether, Speyer (DE); Marco Arnold, Heidelberg (DE); Charlotte Emnet, Stuttgart (DE); Dieter Mayer, Darmstadt (DE)

(73) Assignee: BASF SE, Ludwigshafen (DE)

( * ) Notice: Subject to any disclaimer, the term of this patent is extended or adjusted under 35 U.S.C. 154(b) by 1212 days.

(21) Appl. No.: 13/634,140

(22) PCT Filed: Mar. 17, 2011

(86) PCT No.: PCT/EP2011/054077
§ 371 (c)(1),
(2), (4) Date: Sep. 11, 2012

(87) PCT Pub. No.: WO2011/113908
PCT Pub. Date: Sep. 22, 2011

(65) Prior Publication Data
US 2013/0020203 A1 Jan. 24, 2013

Related U.S. Application Data

(60) Provisional application No. 61/315,051, filed on Mar. 18, 2010.

(30) Foreign Application Priority Data

Mar. 18, 2010 (EP) .................................... 10156915

(51) Int. Cl.
*C08L 79/02* (2006.01)
*C08G 73/02* (2006.01)
(Continued)

(52) U.S. Cl.
CPC .......... *C08L 79/02* (2013.01); *C08G 73/0206* (2013.01); *C25D 3/38* (2013.01);
(Continued)

(58) Field of Classification Search
CPC ............ C25D 3/02; C25D 3/38; C25D 7/123; H05K 3/42
(Continued)

(56) References Cited

U.S. PATENT DOCUMENTS 2,182,306 A 12/1939 Ulrich
2,208,095 A 7/1940 Esselmann
(Continued)

FOREIGN PATENT DOCUMENTS

EP 1 054 080 11/2000
EP 1 118 696 7/2001
(Continued)

OTHER PUBLICATIONS

English Translation of FR2355928.*
(Continued)

*Primary Examiner* — Louis Rufo
(74) *Attorney, Agent, or Firm* — Oblon, McClelland, Maier & Neustadt, L.L.P.

(57) ABSTRACT

A composition comprising a source of metal ions and at least one additive comprising a polyalkyleneimine backbone, said polyalkyleneimine backbone having a molecular weight Mw of from 300 g/mol to 1000000 g/mol, wherein the N hydrogen atoms in the backbone are substituted by a polyoxyalkylene radical and wherein the average number of oxyalkylene units in said polyoxyalkylene radical is from 1.5 to 10 per N—H unit.

28 Claims, 5 Drawing Sheets

(51) Int. Cl.
  *C25D 3/38* (2006.01)
  *C25D 7/12* (2006.01)
  *C25D 3/30* (2006.01)
  *C23C 18/31* (2006.01)

(52) U.S. Cl.
  CPC ............... *C23C 18/31* (2013.01); *C25D 3/30* (2013.01); *C25D 7/123* (2013.01)

(58) Field of Classification Search
  USPC ........................................... 205/95, 118, 297
  See application file for complete search history.

(56) References Cited

U.S. PATENT DOCUMENTS

| | | | |
|---|---|---|---|
| 2,553,696 A | | 5/1951 | Wilson |
| 2,806,839 A | | 9/1957 | Crowther |
| 3,033,746 A | | 5/1962 | Moyle |
| 4,036,711 A | | 7/1977 | Kardos et al. |
| 4,110,176 A | | 8/1978 | Creutz et al. |
| 4,134,802 A | * | 1/1979 | Herr ........................ 205/260 |
| 4,135,991 A | * | 1/1979 | Canaris .................... C25D 3/32 205/253 |
| 4,376,685 A | | 3/1983 | Watson |
| 4,384,930 A | * | 5/1983 | Eckles ..................... C25D 3/22 205/253 |
| 5,277,790 A | | 1/1994 | Morrissey |
| 5,433,840 A | * | 7/1995 | Dahms ..................... C25D 3/38 106/1.26 |
| 6,024,857 A | | 2/2000 | Reid |
| 6,610,192 B1 | | 8/2003 | Step et al. |
| 2003/0168343 A1 | | 9/2003 | Commander et al. |
| 2004/0187731 A1 | | 9/2004 | Wang et al. |
| 2006/0191798 A1 | * | 8/2006 | Sano ........................ C25D 1/04 205/292 |
| 2011/0290659 A1 | | 12/2011 | Roeger-G pfert et al. |
| 2012/0018310 A1 | | 1/2012 | Roeger-Goepfert et al. |
| 2012/0024711 A1 | | 2/2012 | Roeger-Goepfert et al. |
| 2012/0027948 A1 | | 2/2012 | Roeger-Goepfert et al. |

FOREIGN PATENT DOCUMENTS

| | | |
|---|---|---|
| EP | 1 371 757 | 12/2003 |
| EP | 1 479 793 | 11/2004 |
| EP | 1 619 274 | 1/2006 |
| FR | 2 355 928 | 1/1978 |
| WO | 2010 115757 | 10/2010 |

OTHER PUBLICATIONS

U.S. Appl. No. 13/510,328, filed May 17, 2012, Roeger-Goepfert, et al.

U.S. Appl. No. 13/535,847, filed Jun. 28, 2012, Roeger-Goepfert, et al.

U.S. Appl. No. 13/994,540, filed Jun. 14, 2013, Roeger-Goepfert et al.

International Search Report dated Jun. 22, 2011 in PCT/EP11/054077 Filed Mar. 17, 2011.

* cited by examiner

COMPOSITION FOR METAL ELECTROPLATING COMPRISING LEVELING AGENT

Filling of small features, such as vias and trenches, by copper electroplating is an essential part of the semiconductor manufacture process. It is well known, that the presence of organic substances as additives in the electroplating bath can be crucial in achieving a uniform metal deposit on a substrate surface and in avoiding defects, such as voids and seams, within the copper lines.

One class of additives are the so-called levelers. Levelers are used to provide a substantially planar surface over the filled features. In literature, a variety of different leveling compounds has been described. In most cases, leveling compounds are N-containing and optionally substituted and/or quaternized polymers, such as polyethyleneimine, polyglycine, poly(allylamine), polyaniline (sulfonated), polyurea, polyacrylamide, poly(melamine-co-formaldehyde) (US 2004/0187731), reaction products of amines with epichlorohydrin (U.S. Pat. No. 6,610,192), reaction products of an amine, epichlorohydrin, and polyalkylene oxide (EP 1 371 757 A1), reaction products of an amine with a polyepoxide (EP 1 619 274 A2), polyvinylpyridine, polyvinylimidazole (US 2003/0168343 A1), polyvinylpyrrolidone (U.S. Pat. No. 6,024,857), polyalkanolamines (unpublished European Patent application No. 08172330.6), and polyaminoamides (unpublished US Provisional Patent application No. 61/264705)

Polyalkyleneimine and derivatives thereof have been widely used in metal electroplating for many decades. US 05972192 A1, WO 00163016 A1 disclose the use of polyethyleneimine itself. EP 01054080 A2 and U.S. Pat. No. 4,376,685 disclose alkylated polyalkyleneimines. EP 01118696 A1 discloses polyethyleneimines and polybenzyl ethylene imines. U.S. Pat. No. 4,110,176 A1 discloses the quaternized reaction product of polyalkyleneimine with 1 to 2 equivalents ethylene oxide, propylene oxide or glycidylether per two nitrogen atoms, i.e. below 0.5 to 1 equivalents per N—H.

US 2003/0168343 A1 discloses a leveler for submicron sized features preparable by reacting benzyl chloride with hydroxyethyl polyethyleneimine, benzyl chloride with polyethyleneimine, and 1-chloromethylnaphthalene with hydroxyethyl polyethyleneimine. The reaction products are benzyl hydroxyethyl polyethyleneimine, benzyl polyethyleneimine, and methylnaphthyl hydroxyethyl polyethyleneimine, respectively.

It is an object of the present invention to provide a copper electroplating additive having good leveling properties, in particular leveling agents capable of providing a substantially planar copper layer and filling features on the nanometer and on the micrometer scale without substantially forming defects, such as but not limited to voids, with a metal electroplating bath, preferably a copper electroplating bath.

It has been surprisingly discovered that polyalkoxylated polyalkyleneimines and derivatives thereof can be used as additives, in particular leveling agents, in metal, particularly in copper electroplating baths showing an improved performance, particularly on substrates having apertures below 30 nm.

Therefore the present invention provides a composition comprising a source of metal ions and at least one additive comprising a polyalkyleneimine backbone, said polyalkyleneimine backbone having a molecular weight $M_w$ of from 300 g/mol to 1000000 g/mol, wherein the N hydrogen atoms in the backbone are substituted by a polyoxyalkylene radical and wherein the average number of oxyalkylene units in said polyoxyalkylene radical is from 1.5 to 10 per N—H unit.

BRIEF DESCRIPTION OF THE SEVERAL VIEWS OF THE DRAWINGS

FIG. 1a shows a dielectric substrate 1 seeded with a copper layer 2a.

2b shows a lower ratio $a/b$ which is as close as possible to 1, obtained with the use of a leveling agent.

Figure 3:
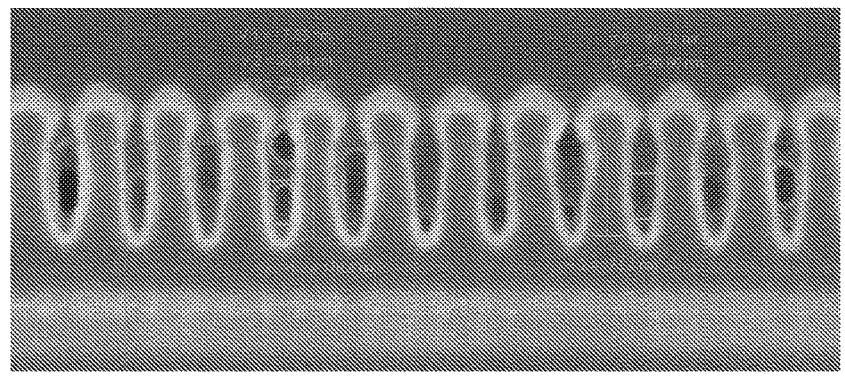

FIG. 3 shows sub-50-nanometer features relevant to FIB/SEM investigations about the influence of the polyethyleneimines on fill performance.

Figure 4A:
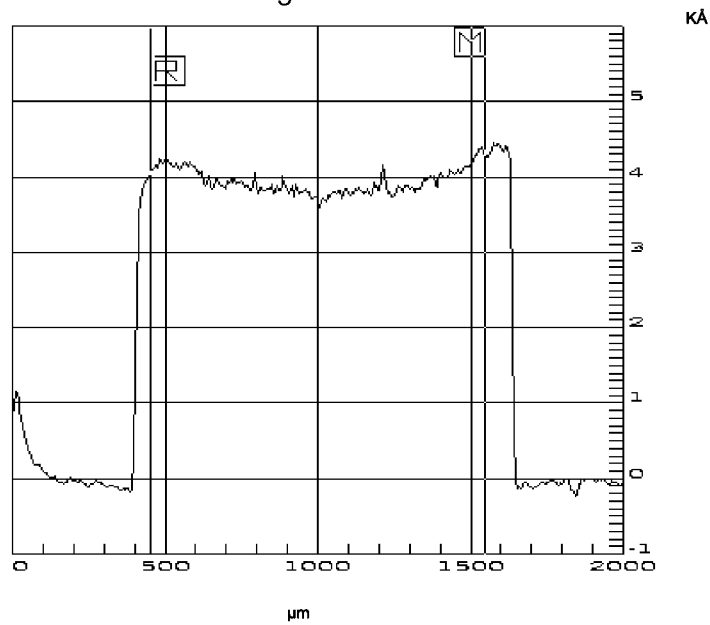

FIG. 4a shows the results using a plating bath without a leveling agent as in Comparative Example 6.

Figure 4B:
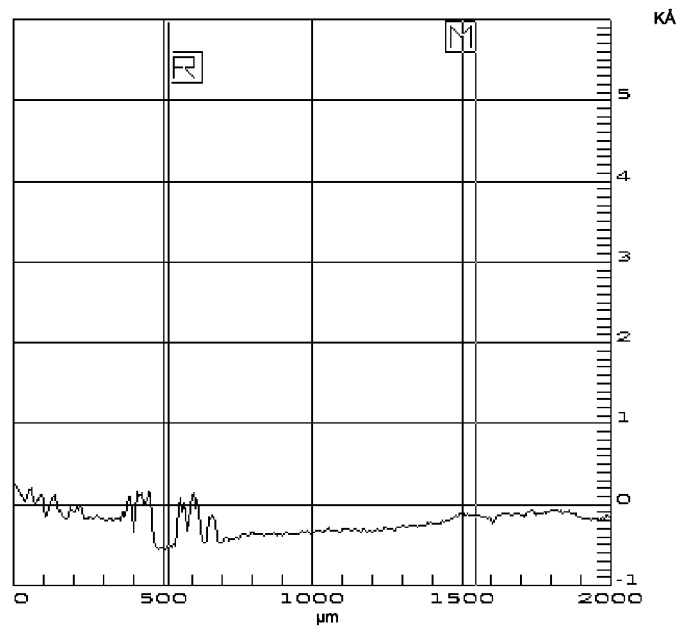

FIG. 4b shows the results using a plating bath with a leveling agent as in Example 7.

Figure 5:
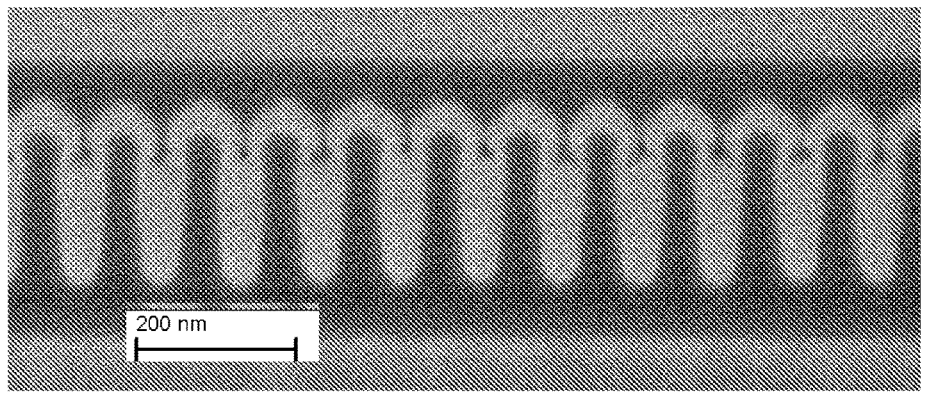

FIG. 5 is an SEM image of the filled trenches without exhibiting any defects like voids or seams obtained as in Comparative Example 12.

Figure 6:
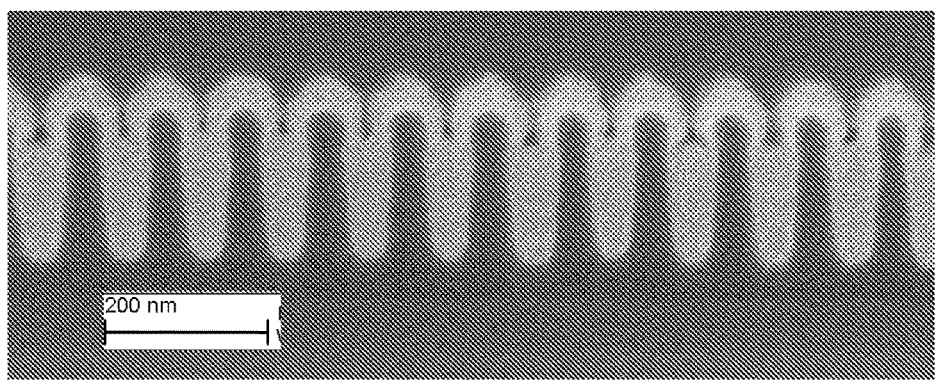

FIG. 6 shows results from the use of a plating bath with a leveling agent, having trenches filled without exhibiting any defects like voids or seams, as in Example 13.

Figure 7:
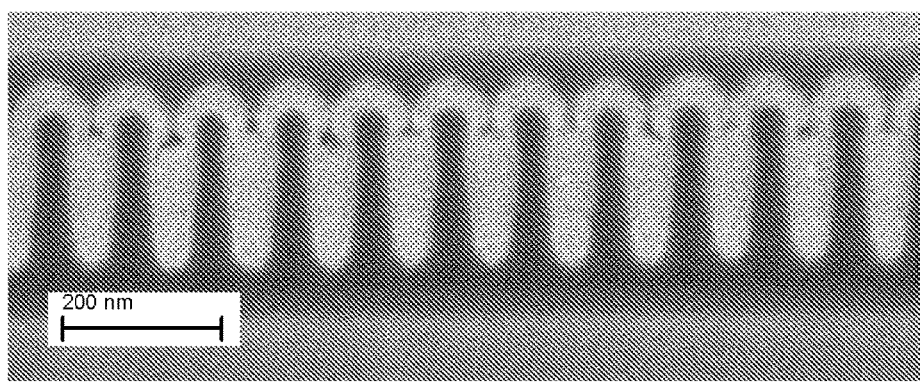

FIG. 7 shows results from the use of a plating bath with a leveling agent, having trenches filled without exhibiting any defects like voids or seams, as in Example 14.

Figure 8:
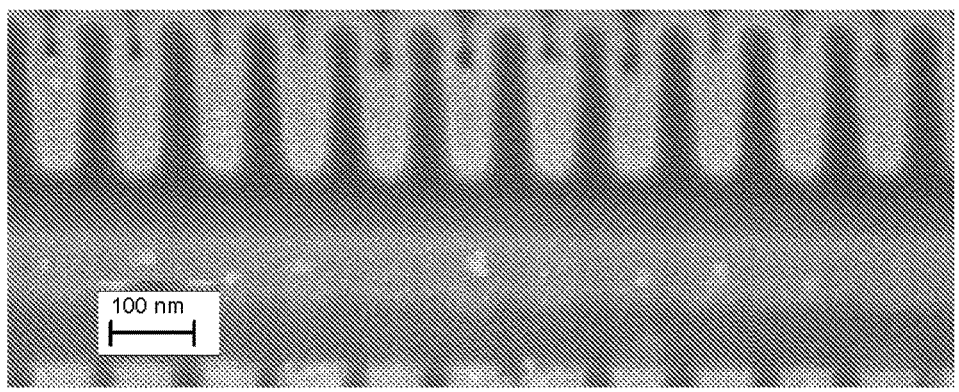

FIG. 8 shows results from the use of a plating bath with a leveling agent, having trenches filled without exhibiting any defects like voids or seams, as in Example 15.

Figure 9:
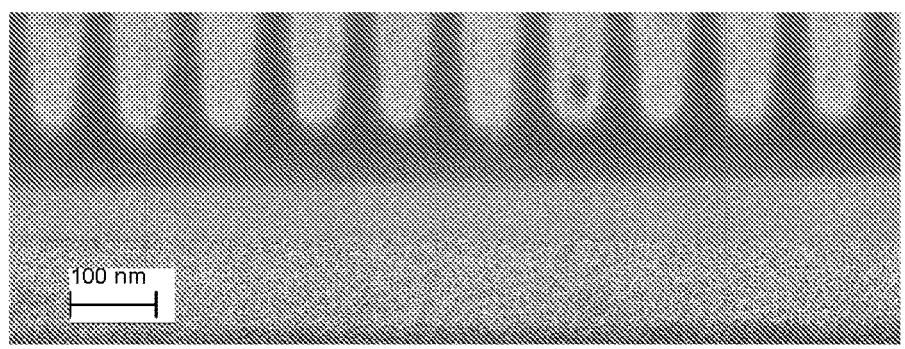

FIG. 9 shows results from using a plating bath with a leveling agent, having filled trenches but with void formation, as in Comparative Example 16.

Figure 10:
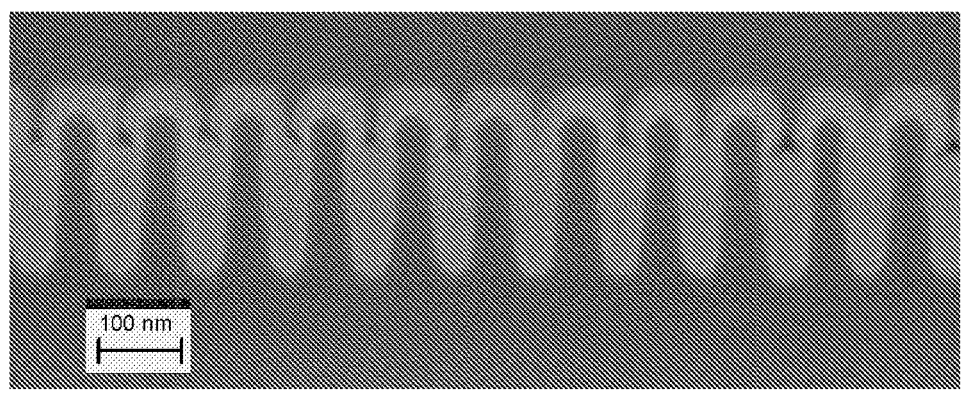

FIG. 10 shows results from the use of a plating bath with a leveling agent, having trenches filled without exhibiting any defects like voids or seams, as in Example 17.

As used herein "average degree of alkoxylation" or "average number of alkoxylation" means the number of alkoxy groups $R^1$—O averaged over the polyoxyalkylene units 1 to p per N—H groups, e.g. a number of 2 means that there are two alkoxy group per N—H groups in the polymer.

It has been found that the use of compositions according to the present invention for electroplating provides deposited metal layers, particularly copper layers, having reduced overplating, particularly reduced mounding. The metal layers provided by the present invention are substantially planar, even on substrates exhibiting apertures of a very wide range of different aperture sizes (scale: ≤130 nanometers to 2 micrometers). Furthermore it has been found that the present invention provides metal layers substantially without the formation of added defects, such as voids, in the features.

The agents/additives according to the present invention can further advantageously be used for electroplating of copper in through silicon vias (TSV). Such vias normally have diameters of several micrometers up to 100 micrometers and large aspect ratios of at least 4, sometimes above 10.

Furthermore the agents/additives according to the present invention can advantageously be used in bonding technologies such as the manufacture of copper pillars of typically 50 to 100 micrometers height and diameter for the bumping process, in circuit board technologies like the manufacture of high-density-interconnects on printed circuit boards using microvia plating or plated-through-hole technologies, or in other packaging processes for electronic circuits.

A further significant advantage of this leveling effect is that less material has to be removed in post-deposition operations. For example, chemical mechanical polishing (CMP) is used to reveal the underlying features. The leveled deposit of the invention corresponds to a reduction in the amount of metal which must be deposited, therefore resulting in less removal later by CMP. There is a reduction in the amount of scrapped metal and, more significantly, a reduction in the time required for the CMP operation. The material removal operation is also less severe which, coupled with the reduced duration, corresponds to a reduction in the tendency of the material removal operation to impart defects.

In contrast to the prior art additives the additive according to the present inventions are polyalkoxylated with a higher average degree of alkoxylation of from 1.5 to 10.

A low degree of alkoxylation leads to a high nitrogen content in the additive.

Without being bound to any theory it is believed that, on the one hand, a sufficiently high nitrogen content in the additive is responsible for a good leveling performance on substrates comprising micrometer or nanometer sized features. On the other hand, when the nitrogen content in the additive is too high, formation of added defects such as voids can occur in sub micron features, and particularly in sub 100 nanometer features.

A higher degree of alkoxylation leads to a lower nitrogen content in the additive. It is believed that polyalkylenepolyamines having an average degree of alkoxylation of from 1.5 to 10 still exhibit a good leveling performance despite a lower nitrogen content and that such additives provide metal deposits without the formation of any added defects, particularly in apertures of 100 nanometer diameter and below.

Preferably, the average number of oxyalkylene units in said polyoxyalkylene radical is from 2 to 8 per N—H unit, more preferably 2 to 5, most preferably 2 to 3.

In a preferred embodiment of the present invention the additive is a polyalkyleneimine of formula L1

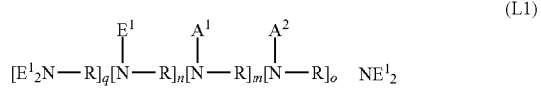

(L1)

or derivatives thereof obtainable by protonation or quaternization, wherein

R is selected from a linear C2-C6 alkanediyl, a branched C3-C6 alkanediyl, and mixtures thereof, $A^1$ is a continuation of the polyalkyleneimine backbone by branching, $A^2$ is selected from alkyl, alkenyl, alkynyl, alkaryl, aryl, and mixtures thereof, $E^1$ is a polyoxyalkylene unit having the formula —$(R^1O)_p R^2$, $R^1$ is, for each n independently, selected from ethanediyl, 1,2-propanediyl, (2-hydroxymethyl)ethanediyl, 1,2-butanediyl, 2,3-butanediyl, 2-methyl-1,2-propanediyl(isobutylene), 1-pentanediyl, 2,3-pentanediyl, 2-methyl-1,2-butanediyl, 3-methyl-1,2-butanediyl, 2,3-hexanediyl, 3,4-hexanediyl, 2-methyl -1,2-pentanediyl, 2-ethyl-1,2-butanediyl, 3-methyl-1,2-pentanediyl, 1,2-decanediyl, 4-methyl-1,2-pentanediyl and (2-phenyl)ethanediyl, and mixtures thereof, $R^2$ is each independently hydrogen, alkyl, alkenyl, alkynyl, alkaryl, aryl, and mixtures thereof, p is a number from 1.5 to 10, q, n, m, o are integers and (q+n+m+o) is from 10 to 24000.

Preferably, R is ethanediyl, i.e. the polyalkyleneimine backbone is formed by polyethyl-eneimine.

Preferably, $R^1$ is selected from ethanediyl or a combination of ethanediyl and 1,2-propanediyl. If $R^1$ is ethanediyl the group R1 may be obtained by reacting the polyalkyleneimine backbone with ethylene oxide. If $R^1$ is propanediyl the group R1 may be obtained by reacting the polyalkyleneimine backbone with ethylene oxide and propylene oxide in mixture or in sequence.

Preferably, $R^2$ is hydrogen.

Preferably, p is from 2 to 5, particularly from 2-3.

Preferably, q+n+m+o is from 15 to 10000, particularly from 20 to 5000. More preferably q+n+m+o is from 25 to 65 or from 1000 to 1800. Preferably o is 0. Preferably q, n and m are in ratio of 1:3 to 3:1, more preferably 1:2 to 2:1, respectively.

Preferably the metal ions comprise copper ions.

A further embodiment of the present invention is the use of the polyalkoxylated polyalkyleneimines as defined above in a bath for depositing metal containing layers.

Yet another embodiment of the present invention is a process for depositing a metal layer on a substrate by contacting a plating solution as described above with the substrate, and applying a current to the substrate to deposit a metal layer onto the substrate. The process is particularly useful for depositing metal, particularly copper layers on substrate comprising micrometer and/or submicrometer-sized features.

Due to its strong leveling performance the additives according to the present inventions are also referred to as leveling agent or leveler. Although the additive according to the present invention has strong leveling properties in electroplating of submicron-sized features, the use and performance of the additives according to the present invention is not limited to its leveling properties and may advantageously be used in other metal plating applications, e.g. for depositing through silicon vias (TSV), for other purposes.

As used herein, "feature" refers to the geometries on a substrate, such as, but not limited to, trenches and vias. "Apertures" refer to recessed features, such as vias and trenches. As used herein, the term "plating" refers to metal electroplating, unless the context clearly indicates otherwise. "Deposition" and "plating" are used interchangeably throughout this specification. The term "alkyl" means C1 to C30 alkyl and includes linear, branched and cyclic alkyl. "Substituted alkyl" means that one or more of the hydrogens on the alkyl group is replaced with another substituent group, such as, but not limited to, cyano, hydroxy, halo, (C1-C6)alkoxy, (C1-C6)alkylthio, thiol, nitro, and the like. As used herein "aryl" includes carbocyclic and heterocyclic aromatic systems, such as, but not limited to, phenyl, naphthyl and the like. By "substituted aryl" is meant that one or more hydrogens on the aryl ring are replaced with one or more substituent groups, such as, but not limited to, cyano, hydroxy, halo, (C1-C6)alkoxy, (C1-C6)alkyl, (C2-C6)alkenyl, (C1-C6)alkylthio, thiol, nitro, and the like. As used herein "alkaryl" includes alkyl substituted carbocyclic and heterocyclic aromatic systems, such as, but not limited to, benzyl, naphthylmethyl and the like. As used herein "polymer" generally means any compound comprising at least two monomeric units i.e. the term polymer includes dimers, trimers, etc., oligomers as well as high molecular weight polymers.

As used herein, "accelerator" refers to an organic additive that increases the plating rate of the electroplating bath. The terms "accelerator" and "accelerating agent" are used interchangeably throughout this specification. In literature, sometimes the accelerator component is also named "brightener" or "brightening agent". "Suppressor" refers to an organic compound that decreases the plating rate of the electroplating bath. The terms "suppressors" and "suppressing agents" are used interchangeably throughout this specification. "Leveler" refers to an organic compound that is capable of providing a substantially planar metal layer. The terms "levelers", "leveling agents" and "leveling additive" are used interchangeably throughout this specification.

The present invention provides a plated metal layer, particularly a plated copper layer, on a substrate containing features on the nanometer and/or micrometer scale wherein the metal layer has reduced overplating and all features are substantially free of added voids, and preferably substantially free of voids. "Overplating" refers to a thicker metal deposit over dense feature areas as compared to areas free of features or at least containing relatively few features. "Dense feature areas" means an area exhibiting smaller distances between neighboring features compared to a comparative area containing apertures with a relatively large distance in between. Smaller distances means distances below 2 micrometer, and preferably below 1 micrometer, and even more preferably below 500 nm. Such difference in the plating thickness over dense feature areas as compared to the plating thickness over areas free of features or containing relatively few features is referred to as "step height" or "mounding".

Suitable substrates are any used in the manufacture of electronic devices, such as integrated circuits. Such substrates typically contain a number of features, particularly apertures, having a variety of sizes. Particularly suitable substrates are those having apertures on the nanometer and on the micrometer scale.

The present invention is achieved by combining one or more additives capable of providing a substantially planar copper layer and filling features on the nanometer and on the micrometer scale without substantially forming defects, such as but not limited to voids, with a metal electroplating bath, preferably a copper electroplating bath.

The additives (further also referred to as leveling agents) according to the present invention can be prepared by reacting a polyalkyleneimine backbone with one or more alkylene oxides.

Polyalkylenepolyamine backbones are to be understood as meaning compounds which consist of a saturated hydrocarbon chain with terminal amino functions which is interrupted by secondary and tertiary amino group. Different polyalkylenepolyamine backbones can of course be used in a mixture with one another.

The polyamine backbones have the general formula L2a:

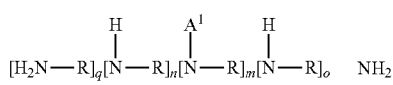 (L2a)

Said backbones prior to subsequent modification comprise primary, secondary and tertiary amine nitrogen atoms connected by R "linking" units. The backbones are comprised of essentially three types of units, which may be randomly distributed along the chain.

The units which make up the polyalkyleneimine backbones are primary units having the formula:

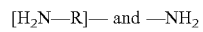

which terminate the main backbone and any branching chains and which, after modification, have their two hydrogen atoms each substituted by from 1.5 to 10 alkyleneoxy units, such as ethyleneoxy units, propyleneoxy units, butyleneoxy units, and mixtures thereof, secondary amine units having the formula:

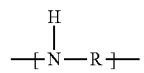

which, after modification, have their hydrogen atom substituted by from 1.5 to 10 alkyleneoxy units, such as ethyleneoxy units, propyleneoxy units, butyleneoxy units, and mixtures thereof, and tertiary amine units having the formula:

which are the branching points of the main and secondary backbone chains, $A^1$ representing a continuation of the chain structure by branching. The tertiary units have no replaceable hydrogen atom and are therefore not modified by substitution with a polyoxyalkylene unit. The branching is the reason that q may be more than 1.

During the formation of the polyamine backbones cyclization may occur, therefore, an amount of cyclic polyamine can be present in the parent polyalkyleneimine backbone mixture. Each primary and secondary amine unit of the cyclic alkyleneimines undergoes modification by the addition of polyoxyalkylene units in the same manner as linear and branched polyalkyleneimines.

R is $C_2$-$C_6$ linear alkanediyl, $C_3$-$C_6$ branched alkanediyl, and mixtures thereof. Preferably branched alkylene is 1,2-propylene. Most preferably R is ethylene. The preferred polyalkyleneimines of the present invention have backbones which comprise the same R unit, for example, all units are ethylene. Most preferred backbone comprises R groups which are all ethylene units.

The lower limit of the molecular weight Mw of the polyalkylenepolyamine backbones is generally about 300 g/mol, preferably about 600 g/mol, more preferably about 1000 g/mol. The upper limit of the molecular weight Mw is generally about 1000000 g/mol, preferably 750000 g/mol, more preferably 200000 g/mol, most preferably 100000 g/mol. An example of a preferred molecular weight for a polyethyleneimine backbone is 2000 g/mol. Another example of a preferred molecular weight for a polyethyleneimine backbone is 60000 g/mol.

The indices n, m and o needed to achieve the preferred molecular weights will vary depending upon the R moiety which comprises the backbone. Preferably, the sum of q, n, m and o is from 10 to 24000, more preferably from 15 to 10000, most preferably from 20 to 5000. Two particularly preferred ranges are from 25 to 65 and from 1000 to 1800.

For example, when R is ethanediyl a backbone unit averages 43 g/mol and when R is hexanediyl a backbone unit averages 99 g/mol.

The polyamines of the present invention can be prepared, for example, by polymerizing ethyleneimine in the presence of a catalyst such as carbon dioxide, sodium bisulfite, sulfuric acid, hydrogen peroxide, hydrochloric acid, acetic acid, etc. Specific methods for preparing these polyamine backbones are disclosed in U.S. Pat. Nos. 2,182,306, 3,033.746, 2,208,095, 2,806,839, and 2,553,696.

In addition, the polyalkyleneimine backbones may be substituted by groups $A^2$. $A^2$ may generally be selected from alkyl, alkenyl, alkynyl, alkaryl, aryl, and mixtures thereof. However, preferably unsubstituted polyalkyleneimines are used for further modification.

The polyalkylenepolyamine backbones of the present invention are modified by substitution of each N—H unit hydrogen with a polyoxyalkylene unit having the formula —$(R^1O)_pH$, wherein $R^1$ is each independently slected from ethanediyl, 1,2-propanediyl, (2-hydroxymethyl)ethanediyl, 1,2-butanediyl, 2,3-butanediyl, 2-methyl-1,2-propanediyl (isobutylene), 1-pentanediyl, 2,3-pentanediyl, 2-methyl-1,2-butanediyl, 3-methyl-1,2-butanediyl, 2,3-hexanediyl, 3,4-hexanediyl, 2-methyl-1,2-pentanediyl, 2-ethyl-1,2-butanediyl, 3-methyl-1,2-pentanediyl, 1,2-decanediyl, 4-methyl-1,2-pentanediyland (2-phenyl)ethanediyl, and mixtures thereof.

Generally p is from 1.5 to 10, preferably from 2 to 8, more preferably from 2 to 5, most preferably from 2-3.

Generally the alkoxylation is performed by reacting the respective alkylene oxides with the polyethyleneimines. The synthesis of polyalkylene oxide units is known to those skilled in the art. Comprehensive details are given, for example, in "Polyoxyalkylenes" in Ullmann's Encyclopedia of Industrial Chemistry, 6th Edition, Electronic Release. When two or more different alkylene oxides are used, the polyoxyalkylene groups formed may be random copolymers, gradient copolymers or block copolymers.

The modification of the N—H units in the polymer backbone with alkylene oxide units is carried out, for instance, by first reacting the polymer, preferably polyethyleneimine, with one ore more alkylene oxides, preferably ethylene oxide, propylene oxide, or mixtures thereof, in the presence of up to 80 percent by weight of water at a temperature of from about 25 to about 150 degrees C. in an autoclave fitted with a stirrer. In the first step of the reaction alkylene oxide is added in such an amount that nearly all hydrogen atoms of the N—H-groups of the polyalkyleneimine are converted into hydroxyalkyl groups to give monoalkoxylated polyalkylenepolyamines. The water is then removed from the autoclave. After the addition of a basic catalyst, for example sodium methylate, potassium tertiary butylate, potassium hydroxide, sodium hydroxide, sodium hydride, potassium hydride or an alkaline ion exchanger in an amount of 0,1 to 15 percent by weight with reference to the addition product obtained in the first step of the alkoxylation, further amounts of alkylene oxide are added to the reaction product of the first step so that a polyalkoxylated polyalkyleneimine is obtained which contains 1.5 to 10, preferably 2 to 5, most preferably 2 to 3 alkylene oxide units per N—H group of the polymer. The second step is carried out for instance at temperatures of from about 60 to about 150 degrees C. The second step of the alkoxylation may be carried out in an organic solvent such as xylene or toluene. For the correct metered addition of the alkylene oxides, it is advisable, before the alkoxylation, to determine the number of primary and secondary amine groups of the polyalkylenepolyamine.

The polyalkoxylated polyalkylenepolyamines can optionally be functionalized in a further reaction step. An additional functionalization can serve to modify the properties of the polyalkoxylated polyalkylenepolyamines. To this end, the hydroxyl groups and/or amino groups present in the polyoxyalkylated polyalkyleneimines are converted by means of suitable agents, which are capable of reaction with hydroxyl groups and/or amino groups. This forms functionalized polyalkoxylated polyalkylenepolyamines.

For example, the amino groups present in the polyalkoxylated polyalkylenepolyamines can be protonated or functionalized by means of suitable alkylating agents. Examples for suitable alkylating agents are organic compounds which contain active halogen atoms, such as the aralkyl halides, the alkyl, alkenyl and alkynyl halides, and the like. Additionally, compounds such as the alkyl sulfates, alkyl sultones, epoxides, and the like may also be used. Examples of corresponding alkylating agents comprise benzyl chloride, propane sultone, dimethyl sulphate, (3-chloro-2-hydroxypropyl)trimethyl ammonium chloride, or the like. Preference is given to using dimethyl sulphate and/or benzyl chloride.

The terminal hydroxyl groups of the polyalkoxylated polyalkylenepolyamines can be reacted with suitable reagents for derivatization, which forms groups of the general formula —$(R^1O)_pR^2$ where $R^2$ is any desired group. The type of functionalization depends on the desired end use. According to the functionalizing agent, the chain end can be hydrophobized or more strongly hydrophilized.

The terminal hydroxyl groups can be esterified, for example, with sulfuric acid or derivatives thereof, so as to form products with terminal sulfate groups. Analogously, products having terminal phosphorus groups can be obtained with phosphoric acid, phosphorous acid, polyphosphoric acid, $POCl_3$ or $P_4O_{10}$.

In addition, the terminal OH groups may also be etherified, so as to form ether-terminated polyalkoxy groups, where $R^2$ is an alkyl, alkenyl, alkynyl, alkaryl, or aryl group. Preferably, $R^2$ may be methyl, ethyl or benzyl.

It will be appreciated by those skilled in the art that more than one leveling agent may be used. When two or more leveling agents are used, at least one of the leveling agents is a polyalkoxylated polyalkylenepolyamine or a derivative thereof as described herein. It is preferred to use only one polyalkoxylated polyalkylenepolyamine leveling agent in the plating composition.

Suitable additional leveling agents include, but are not limited to, one or more of polyalkanolamine and derivatives thereof, polyethyleneimine and derivatives thereof, quaternized polyethyleneimine, polyaminoamide and derivatives thereof, polyglycine, poly(allylamine), polyaniline, polyurea, polyacrylamide, poly(melamine-co-formaldehyde), reaction products of amines with epichlorohydrin, reaction products of an amine, epichlorohydrin, and polyalkylene oxide, reaction products of an amine with a polyepoxide, polyvinylpyridine, polyvinylimidazole, polyvinylpyrrolidone, or copolymers thereof, nigrosines, pentamethyl-pararosaniline hydrohalide, hexamethyl-pararosaniline hydrohalide, or compounds containing a functional group of the formula N—R—S, where R is a substituted alkyl, unsubstituted alkyl, substituted aryl or unsubstituted aryl. Typically, the alkyl groups are (C1-C6)alkyl and preferably (C1-C4)alkyl. In general, the aryl groups include (C6-C20) aryl, preferably (C6-C10)aryl. Such aryl groups may further include heteroatoms, such as sulfur, nitrogen and oxygen. It is preferred that the aryl group is phenyl or napthyl. The compounds containing a functional group of the formula N—R—S are generally known, are generally commercially available and may be used without further purification.

In such compounds containing the N—R—S functional group, the sulfur ("S") and/or the nitrogen ("N") may be attached to such compounds with single or double bonds. When the sulfur is attached to such compounds with a single bond, the sulfur will have another substituent group, such as but not limited to hydrogen, (C1-C12)alkyl, (C2-C12)alkenyl, (C6-C20)aryl, (C1-C12)alkylthio, (C2-C12)alkenylthio, (C6-C20)arylthio and the like. Likewise, the nitrogen will have one or more substituent groups, such as but not limited to hydrogen, (C1-C12)alkyl, (C2-C12)alkenyl, (C7-C10)aryl, and the like. The N—R—S functional group may be acyclic or cyclic. Compounds containing cyclic N—R—S functional groups include those having either the nitrogen or the sulfur or both the nitrogen and the sulfur within the ring system.

In general, the total amount of leveling agents in the electroplating bath is from 0.5 ppm to 10000 ppm based on the total weight of the plating bath. The leveling agents according to the present invention are typically used in a total amount of from about 0.1 ppm to about 1000 ppm based on the total weight of the plating bath and more typically from 1 to 100 ppm, although greater or lesser amounts may be used.

The electroplating baths according to the present invention may include one or more optional additives. Such optional additives include, but are not limited to, accelerators, suppressors, surfactants and the like. Such suppressors and accelerators are generally known in the art. It will be clear to one skilled in the art which suppressors and/or accelerators to use and in what amounts.

A large variety of additives may typically be used in the bath to provide desired surface finishes for the Cu plated metal. Usually more than one additive is used with each additive forming a desired function. Advantageously, the electroplating baths may contain one or more of accelerators, suppressors, sources of halide ions, grain refiners and mixtures thereof. Most preferably the electroplating bath contains both, an accelerator and a suppressor in addition to the leveling agent according to the present invention. Other additives may also be suitably used in the present electroplating baths.

Any accelerators may be advantageously used in the present invention. Accelerators useful in the present invention include, but are not limited to, compounds comprising one or more sulphur atom and a sulfonic/phosphonic acid or their salts.

The generally preferred accelerators have the general structure $M^4O_3X^4$—$R^{41}$—$(S)_a$—$R^{42}$, with:
- $M^4$ is a hydrogen or an alkali metal (preferably Na or K)
- $X^4$ is P or S
- $a=1$ to 6
- $R^{41}$ is selected from C1-C8 alkyl group or heteroalkyl group, an aryl group or a heteroaromatic group. Heteroalkyl groups will have one or more heteroatom (N, S, O) and 1-12 carbons. Carbocyclic aryl groups are typical aryl groups, such as phenyl, naphtyl. Heteroaromatic groups are also suitable aryl groups and contain one or more N, O or S atom and 1-3 separate or fused rings.
- $R^{42}$ is selected from H or (—S—$R^{41'}X^{4'}O_3M^{4'}$), with $R^{41'}$ being identical or different from $R^{41}$.

More specifically, useful accelerators include those of the following formulae:

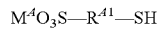

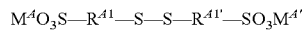

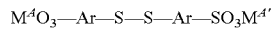

with $R^{41}$ as defined above and Ar is Aryl.

Particularly preferred accelerating agents are:
SPS: bis-(3-sulfopropyl)-disulfide disodium salt
MPS: 3-mercapto-1-propanesulfonic acid, sodium salt Other examples of accelerators, used alone or in mixture, include, but are not limited to: MES (2-Mercaptoethanesulfonic acid, sodium salt); DPS (N,N-dimethyldithiocarbamic acid (3-sulfopropylester), sodium salt); UPS (3-[(aminoiminomethyl)-thio]-1-propylsulfonic acid); ZPS (3-(2-benzthiazolylthio)-1-propanesulfonic acid, sodium salt); 3-mercapto-propylsulfonicacid-(3-sulfopropyl)ester; methyl-($\overline{\omega}$-sulphopropyl)-disulfide, disodium salt; methyl-($\overline{\omega}$- sulphopropyl)-trisulfide, disodium salt.

Such accelerators are typically used in an amount of about 0.1 ppm to about 3000 ppm, based on the total weight of the plating bath. Particularly suitable amounts of accelerator useful in the present invention are 1 to 500 ppm, and more particularly 2 to 100 ppm.

Any suppressing agent may be advantageously used in the present invention. Suppressing agents useful in the present invention include, but are not limited to, polymeric materials, particularly those having heteroatom substitution, and more particularly oxygen substitution. It is preferred that the suppressing agent is a polyalkyleneoxide. Suitable suppressing agents include polyethylene glycol copolymers, particularly polyethylene glycol polypropylene glycol copolymers. The arrangement of ethylene oxide and propylene oxide of suitable suppressors may be block, gradient, or random. The polyalkylene glycol may comprise further alkylene oxide building blocks such as butylene oxide. Preferably, the average molecular weight of suitable suppressors exceeds about 2000 g/mol. The starting molecules of suitable polyalkylene glycol may be alkyl alcohols such as methanol, ethanol, propanol, n-butanol and the like, aryl alcohols such as phenols and bisphenols, alkaryl alcohols such as benzyl alcohol, polyol starters such as glycol, glycerin, trimethylol propane, pentaerythritol, sorbitol, carbohydrates such as saccharose, and the like, amines and oligoamines such as alkyl amines, aryl amines such as aniline, triethanol amine, ethylene diamine, and the like, amides, lactams, heterocyclic amines such as imidazol and carboxylic acids. Optionally, polyalkylene glycol suppressors may be functionalized by ionic groups such as sulfate, sulfonate, ammonium, and the like.

Particularly useful suppressing agents in combination with the levelers according to the present inventions are:

(a) suppressing agents obtainable by reacting an amine compound comprising at least three active amino functional groups with a mixture of ethylene oxide and at least one compound selected from $C_3$ and $C_4$ alkylene oxides as described in European Patent Application No. 9157540.7.

Preferably the amine compound is selected from diethylene triamine, 3-(2-aminoethyl)aminopropylamine, 3,3'-iminodi(propylamine), N,N-bis(3-aminopropyl)methylamine, bis(3-dimethylaminopropyl)amine, triethylenetetraamine and N,N'-bis(3-aminopropyl)ethylenediamine.

(b) Suppressing agents obtainable by reacting an amine compound comprising active amino functional groups with a mixture of ethylene oxide and at least one compound selected from $C_3$ and $C_4$ alkylene oxides, said suppressing agent having a molecular weight $M_w$ of 6000 g/mol or more, forming an ethylene C3 and/or C4 alkylene random copolymer as described in European Patent Application No. 09157542.3.

(c) Suppressing agent obtainable by reacting an amine compound comprising at least three active amino functional groups with ethylene oxide and at least one compound selected from C3 and C4 alkylene oxides from a mixture or in sequence, said suppressing agent having a molecular weight $M_w$ of 6000 g/mol or more as described in European Patent Application No. 09157543.

Preferably the amine compound is selected from ethylene diamine, 1,3-diaminopropane, 1,4-diaminobutane, 1,5-diaminopentane, 1,6-diaminohexane, neopentanediamine, isophoronediamine, 4,9-dioxadecane-1,12-diamine, 4,7,10-trioxatridecane-1,13-diamine, triethylene glycol diamine, diethylene triamine, (3-(2-aminoethyl)amino)propylamine, 3,3'-iminodi(propylamine), N,N-bis(3-aminopropyl)methylamine, bis(3-dimethylaminopropyl)amine, triethylenetetraamine and N,N'-bis(3-aminopropyl)ethylenediamine.

(d) Suppressing agent selected from compounds of formula S1

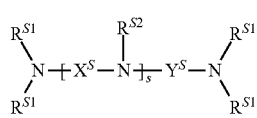
(S1)

wherein the $R^{S1}$ radicals are each independently selected from a copolymer of ethylene oxide and at least one further C3 to C4 alkylene oxide, said copolymer being a random copolymer, the $R^{S2}$ radicals are each independently selected from $R^{S1}$ or alkyl, $X^S$ and $Y^S$ are spacer groups independently, and $X^S$ for each repeating unit independently, selected from C2 to C6 alkylene and $Z^S$—(O—$Z^S$)$_t$ wherein the $Z^S$ radicals are each independently selected from C2 to C6 alkylene, s is an integer equal to or greater than 0, and t is an integer equal to or greater than 1, as described in European Patent Application No. 09005106.1.

Preferably spacer groups $X^S$ and $Y^S$ are independently, and $X^S$ for each repeating unit independently, selected from C2 to C4 alkylene. Most preferably $X^S$ and $Y^S$ are independently, and $X^S$ for each repeating unit independently, selected from ethylene (—C$_2$H$_4$—) or propylene (—C$_3$H$_6$—).

Preferably $Z^S$ is selected from C2 to C4 alkylene, most preferably from ethylene or propylene.

Preferably s is an integer from 1 to 10, more preferably from 1 to 5, most preferably from 1 to 3. Preferably t is an integer from 1 to 10, more preferably from 1 to 5, most preferably from 1 to 3.

In another preferred embodiment the C3 to C4 alkylene oxide is selected from propylene oxide (PO). In this case EO/PO copolymer side chains are generated starting from the active amino functional groups The content of ethylene oxide in the copolymer of ethylene oxide and the further C3 to C4 alkylene oxide can generally be from about 5% by weight to about 95% by weight, preferably from about 30% by weight to about 70% by weight, particularly preferably between about 35% by weight to about 65% by weight.

The compounds of formula (S1) are prepared by reacting an amine compound with one ore more alkylene oxides. Preferably the amine compound is selected from ethylene diamine, 1,3-diaminopropane, 1,4-diaminobutane, 1,5-diaminopentane, 1,6-diaminohexane, neopentanediamine, isophoronediamine, 4,9-dioxadecane-1,12-diamine, 4,7,10-trioxatridecane-1,13-diamine, triethylene glycol diamine, diethylene triamine, (3-(2-aminoethyl)amino)propylamine, 3,3'-iminodi(propylamine), N,N-bis(3-aminopropyl)methylamine, bis(3-dimethylaminopropyl)amine, triethylenetetraamine and N,N'-bis(3-aminopropyl)ethylenediamine.

The molecular weight $M_w$ of the suppressing agent of formula S1 may be between about 500 g/mol to about 30000 g/mol. Preferably the molecular weight $M_w$ should be about 6000 g/mol or more, preferably from about 6000 g/mol to about 20000 g/mol, more preferably from about 7000 g/mol to about 19000 g/mol, and most preferably from about 9000 g/mol to about 18000 g/mol. Preferred total amounts of alkylene oxide units in the suppressing agent may be from about 120 to about 360, preferably from about 140 to about 340, most preferably from about 180 to about 300.

Typical total amounts of alkylene oxide units in the suppressing agent may be about 110 ethylene oxide units (EO) and 10 propylene oxide units (PO), about 100 EO and 20 PO, about 90 EO and 30 PO, about 80 EO and 40 PO, about 70 EO and 50 PO, about 60 EO and 60 PO, about 50 EO and 70 PO, about 40 EO and 80 PO, about 30 EO and 90 PO, about 100 EO and 10 butylene oxide (BO) units, about 90 EO and 20 BO, about 80 EO and 30 BO, about 70 EO and 40 BO, about 60 EO and 50 BO or about 40 EO and 60 BO to about 330 EO and 30 PO units, about 300 EO and 60 PO, about 270 EO and 90 PO, about 240 EO and 120 PO, about 210 EO and 150 PO, about 180 EO and 180 PO, about 150 EO and 210 PO, about 120 EO and 240 PO, about 90 EO and 270 PO, about 300 EO and 30 butylene oxide (BO) units, about 270 EO and 60 BO, about 240 EO and 90 BO, about 210 EO and 120 BO, about 180 EO and 150 BO, or about 120 EO and 180 BO.

(e) Suppressing agent obtainable by reacting a polyhydric alcohol condensate compound derived from at least one polyalcohol of formula (S2) $Z^S(OH)_u$ by condensation with at least one alkylene oxide to form a polyhydric alcohol condensate comprising polyoxyalkylene side chains, wherein u is an integer from 3 to 6 and $X^S$ is an u-valent linear or branched aliphatic or cycloaliphatic radical having from 3 to 10 carbon atoms, which may be substituted or unsubstituted, as described in US Provisional Patent Application No. 61/229803.

Preferred polyalcohol condensates are selected from compounds of formulae

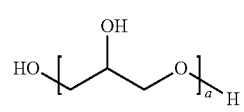
(S2a)

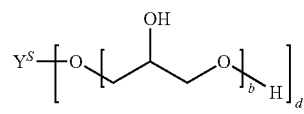
(S2b)

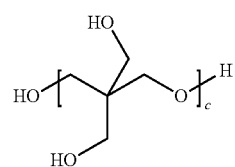
(S2c)

wherein $Z^S$ is an d-valent linear or branched aliphatic or cycloaliphatic radical having from 1 to 10 carbon atoms, which may be substituted or unsubstituted, a is an integer from 2 to 50, b may be the same or different for each polymer arm d and is an integer from 1 to 30, c is an integer from 2 to 3, and d is an integer from 1 to 6. Most preferred polyalcohols are glycerol condensates and/or pentaerythritol condensates.

(f) suppressing agent obtainable by reacting a polyhydric alcohol comprising at least 5 hydroxyl functional groups with at least one alkylene oxide to form a polyhydric alcohol comprising polyoxyalkylene side chains as described in U.S. Provisional Application No. 61/229,809. Preferred polyalcohols are linear or cyclic monosaccharide alcohols represented by formula (S3a) or (S3b)

$$HOCH_2\text{---}(CHOH)_v\text{---}CH_2OH \quad (S3a)$$

$$(CHOH)_w \quad (S3b)$$

wherein v is an integer from 3 to 8 and w is an integer form 5 to 10. Most preferred monosaccharide alcohols are sorbitol, mannitol, xylitol, ribitol and inositol. Further preferred polyalcohols are monosaccharides of formula (S4a) or (S4b)

$$CHO\text{---}(CHOH)_x\text{---}CH_2OH \quad (S4a)$$

$$CH_2OH\text{---}(CHOH)_y\text{---}CO\text{---}(CHOH)_z\text{---}CH_2OH \quad (S4b)$$

wherein x is an integer of 4 to 5, and y, z are integers and y+z is 3 or 4. Most preferred monosaccharide alcohols are selected from the aldoses allose, altrose, galactose, glucose, gulose, idose, mannose, talose, glucoheptose, mannoheptose or the ketoses fructose, psicose, sorbose, tagatose, mannoheptulose, sedoheptulose, taloheptulose, alloheptulose.

These are particularly effective, strong suppressing agents that cope with the seed overhang issue and provide substantially defect free trench filling despite a non-conformal copper seed.

When suppressors are used, they are typically present in an amount in the range of from about 1 to about 10,000 ppm based on the weight of the bath, and preferably from about 5 to about 10,000 ppm.

The metal ion source may be any compound capable of releasing metal ions to be deposited in the electroplating bath in sufficient amount, i.e is at least partially soluble in the electroplating bath. It is preferred that the metal ion source is soluble in the plating bath. Suitable metal ion sources are metal salts and include, but are not limited to, metal sulfates, metal halides, metal acetates, metal nitrates, metal fluoroborates, metal alkylsulfonates, metal arylsulfonates, metal sulfamates, metal gluconates and the like. It is preferred that the metal is copper. It is further preferred that the source of metal ions is copper sulfate, copper chloride, copper acetate, copper citrate, copper nitrate, copper fluoroborate, copper methane sulfonate, copper phenyl sulfonate and copper p-toluene sulfonate. Copper sulfate pentahydrate and copper methane sulfonate are particularly preferred. Such metal salts are generally commercially available and may be used without further purification.

Besides metal electroplating the compositions may be used in electroless deposition of metal containing layers. The compositions may particularly used in the deposition of barrier layers containing Ni, Co, Mo, W and/ or Re. In this case, besides metal ions, further elements of groups III and V, particularly B and P may be present in the composition for electroless deposition and thus co-deposited with the metals.

The metal ion source may be used in the present invention in any amount that provides sufficient metal ions for electroplating on a substrate. Suitable metal ion metal sources include, but are not limited to, tin salts, copper salts, and the like. When the metal is copper, the copper salt is typically present in an amount in the range of from about 1 to about 300 g/l of plating solution. It will be appreciated mixtures of metal salts may be electroplated according to the present invention. Thus, alloys, such as copper-tin having up to about 2 percent by weight tin, may be advantageously plated according to the present invention. The amounts of each of the metal salts in such mixtures depend upon the particular alloy to be plated and is well known to those skilled in the art.

In general, besides the metal ion source and at least one of the leveling agents (L1) the present metal electroplating compositions preferably include electrolyte, i. e. acidic or alkaline electrolyte, one or more sources of metal ions, optionally halide ions, and optionally other additives like accelerators and/or suppressors. Such baths are typically aqueous. The water may be present in a wide range of amounts. Any type of water may be used, such as distilled, deionized or tap.

The electroplating baths of the present invention may be prepared by combining the components in any order. It is preferred that the inorganic components such as metal salts, water, electrolyte and optional halide ion source, are first added to the bath vessel followed by the organic components such as leveling agents, accelerators, suppressors, surfactants and the like.

Typically, the plating baths of the present invention may be used at any temperature from 10 to 65 degrees C. or higher. It is preferred that the temperature of the plating baths is from 10 to 35 degrees C. and more preferably from 15 degrees to 30 degrees C.

Suitable electrolytes include such as, but not limited to, sulfuric acid, acetic acid, fluoroboric acid, alkylsulfonic acids such as methanesulfonic acid, ethanesulfonic acid, propanesulfonic acid and trifluoromethane sulfonic acid, arylsulfonic acids such as phenyl sulfonic acid and toluenesulfonic acid, sulfamic acid, hydrochloric acid, phosphoric acid, tetraalkylammonium hydroxide, preferably tetramethylammonium hydroxide, sodium hydroxide, potassium hydroxide and the like. Acids are typically present in an amount in the range of from about 1 to about 300 g/L, alkaline electrolytes are typically present in an amount of about 0.1 to about 20 g/L or to yield a pH of 8 to 13 respectively, and more typically to yield a pH of 9 to 12.

Such electrolytes may optionally contain a source of halide ions, such as chloride ions as in copper chloride or hydrochloric acid. A wide range of halide ion concentrations may be used in the present invention such as from about 0 to about 500 ppm. Typically, the halide ion concentration is in the range of from about 10 to about 100 ppm based on the plating bath. It is preferred that the electrolyte is sulfuric acid or methane-sulfonic acid, and preferably a mixture of sulfuric acid or methanesulfonic acid and a source of chloride ions. The acids and sources of halide ions useful in the present invention are generally commercially available and may be used without further purification.

The general process of copper electrodeposition on semiconductor integrated circuit substrates is described with respect to FIGS. 1 and 2 without restricting the invention thereto.

Figure 1A:
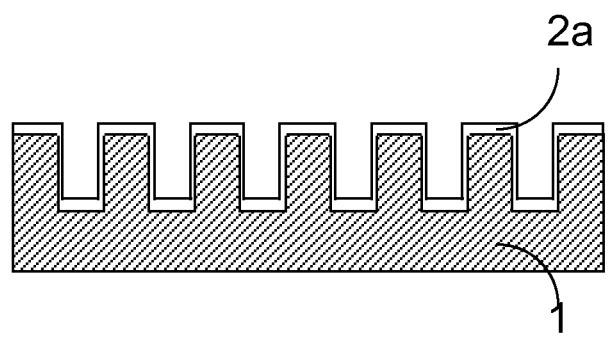
Figure 1B:
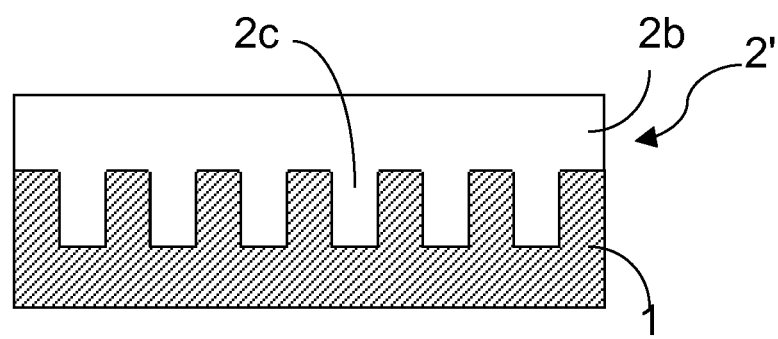
FIG. 1b shows a copper layer 2' is deposited onto the dielectric substrate 1 by electrodeposition.
Figure 1C:
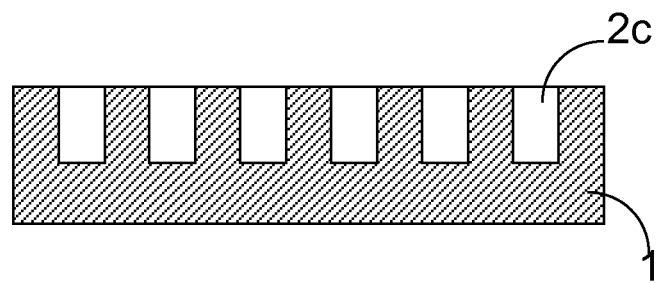
FIG. 1c shows the product of removing overburden of copper 2b by chemical mechanical planarization (CMP).

FIG. 1a shows a dielectric substrate 1 seeded with a copper layer 2a. With reference to FIG. 1b a copper layer 2' is deposited onto the dielectric substrate 1 by electrodeposition. The trenches 2c of the substrate 1 are filled and an overplating of copper 2b, also referred to as "overburden", is generated on top of the whole structured substrate. During the process, after optional annealing, the overburden of copper 2b is removed by chemical mechanical planarization (CMP), as depicted in FIG. 1c.

Figure 2A:
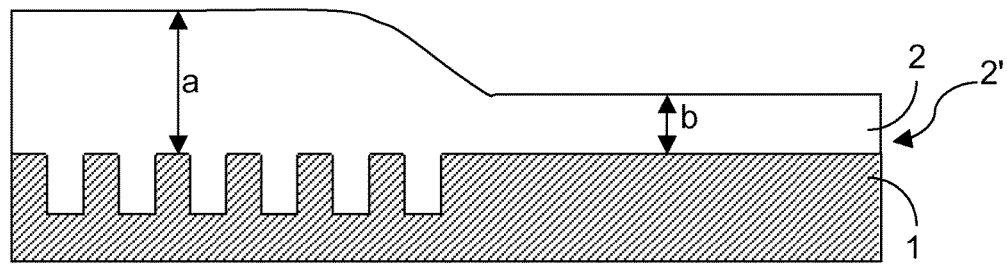
FIG. 2a shows a high ratio $a/b \gg 1$ (mounding) which is present where there has been no leveling agent.
Figure 2B:
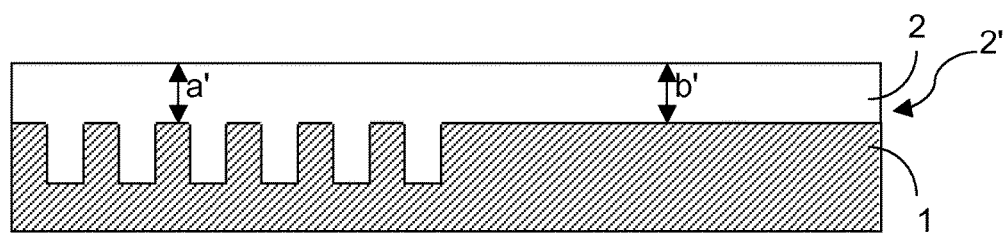

The effect of a leveling agent is generally described with respect to FIGS. 2a and 2b. Without a leveling agent the deposition leads to a high ratio a/b>>1, the so called mounding. In contrast, the aim is to reduce the ratio a/b to a value, which is as close as possible to 1.

A particular advantage of the present invention is that overplating, particularly mounding, is reduced or substantially eliminated. Such reduced overplating means less time and effort is spent in removing metal, such as copper, during subsequent chemical-mechanical planarization (CMP) processes, particularly in semiconductor manufacture. A further advantage of the present invention is that a wide range of aperture sizes may be filled within a single substrate resulting in a substantially even surface having a ratio a/b of 1.5 or less, preferably 1.2 or less, most preferably 1.1 or less. Thus, the present invention is particularly suitable to evenly filling apertures in a substrate having a variety of aperture sizes, such as from 0.01 micrometer to 100 micrometer or even larger.

A further significant advantage of this leveling effect is that less material has to be removed in post-deposition operations. For example, chemical mechanical planarization (CMP) is used to reveal the underlying features. The leveled deposit of the invention corresponds to a reduction in the amount of metal which must be deposited, therefore resulting in less removal later by CMP. There is a reduction in the amount of scrapped metal and, more significantly, a reduction in the time required for the CMP operation. The material removal operation is also less severe which, coupled with the reduced duration, corresponds to a reduction in the tendency of the material removal operation to impart defects.

Metal, particularly copper, is deposited in apertures according to the present invention without substantially forming voids within the metal deposit. By the term "without substantially forming voids", it is meant that 95% of the plated apertures are void-free. It is preferred that the plated apertures are void-free.

Typically, substrates are electroplated by contacting the substrate with the plating baths of the present invention. The substrate typically functions as the cathode. The plating bath contains an anode, which may be soluble or insoluble. Optionally, cathode and anode may be separated by a membrane. Potential is typically applied to the cathode. Sufficient current density is applied and plating performed for a period of time sufficient to deposit a metal layer, such as a copper layer, having a desired thickness on the substrate. Suitable current densities, include, but are not limited to, the range of 1 to 250 $mA/cm^2$. Typically, the current density is in the range of 1 to 60 $mA/cm^2$ when used to deposit copper in the manufacture of integrated circuits. The specific current density depends upon the substrate to be plated, the leveling agent selected and the like. Such current density choice is within the abilities of those skilled in the art. The applied current may be a direct current (DC), a pulse current (PC), a pulse reverse current (PRC) or other suitable current.

In general, when the present invention is used to deposit metal on a substrate such as a wafer used in the manufacture of an integrated circuit, the plating baths are agitated during use. Any suitable agitation method may be used with the present invention and such methods are well-known in the art. Suitable agitation methods include, but are not limited to, inert gas or air sparging, work piece agitation, impingement and the like.

Such methods are known to those skilled in the art. When the present invention is used to plate an integrated circuit substrate, such as a wafer, the wafer may be rotated such as from 1 to 150 RPM and the plating solution contacts the rotating wafer, such as by pumping or spraying. In the alternative, the wafer need not be rotated where the flow of the plating bath is sufficient to provide the desired metal deposit.

Metal, particularly copper, is deposited in apertures according to the present invention without substantially forming voids within the metal deposit. By the term "without substantially forming voids", it is meant that 95% of the plated apertures are void-free. It is preferred that the plated apertures are void-free.

While the process of the present invention has been generally described with reference to semiconductor manufacture, it will be appreciated that the present invention may be useful in any electrolytic process where an essentially level or planar copper deposit having high reflectivity is desired, and where reduced overplating and metal filled small features that are substantially free of voids are desired. Such processes include printed wiring board manufacture. For example, the present plating baths may be useful for the plating of vias, pads or traces on a printed wiring board, as well as for bump plating on wafers. Other suitable processes include packaging and interconnect manufacture. Accordingly, suitable substrates include lead frames, interconnects, printed wiring boards, and the like.

Plating equipment for plating semiconductor substrates are well known. Plating equipment comprises an electroplating tank which holds Cu electrolyte and which is made of a suitable material such as plastic or other material inert to the electrolytic plating solution. The tank may be cylindrical, especially for wafer plating. A cathode is horizontally disposed at the upper part of tank and may be any type substrate such as a silicon wafer having openings such as trenches and vias. The wafer substrate is typically coated with a seed layer of Cu or other metal to initiate plating thereon. A Cu seed layer may be applied by chemical vapor deposition (CVD), physical vapor deposition (PVD), or the like. An anode is also preferably circular for wafer plating and is horizontally disposed at the lower part of tank forming a space between the anode and cathode. The anode is typically a soluble anode.

These bath additives are useful in combination with membrane technology being developed by various tool manufacturers. In this system, the anode may be isolated from the organic bath additives by a membrane. The purpose of the separation of the anode and the organic bath additives is to minimize the oxidation of the organic bath additives.

The cathode substrate and anode are electrically connected by wiring and, respectively, to a rectifier (power supply). The cathode substrate for direct or pulse current has a net negative charge so that Cu ions in the solution are reduced at the cathode substrate forming plated Cu metal on the cathode surface. An oxidation reaction takes place at the anode. The cathode and anode may be horizontally or vertically disposed in the tank.

The present invention is useful for depositing a metal layer, particularly a copper layer, on a variety of substrates, particularly those having variously sized apertures. For example, the present invention is particularly suitable for depositing copper on integrated circuit substrates, such as semiconductor devices, with small diameter vias, trenches or other apertures. In one embodiment, semiconductor devices are plated according to the present invention. Such semiconductor devices include, but are not limited to, wafers used in the manufacture of integrated circuits.

While the process of the present invention has been generally described with reference to semiconductor manufacture, it will be appreciated that the present invention may be useful in any electrolytic process where an essentially level or planar copper deposit having high reflectivity is desired. Accordingly, suitable substrates include lead frames, interconnects, printed wiring boards, and the like.

All percent, ppm or comparable values refer to the weight with respect to the total weight of the respective composition except where otherwise indicated. All cited documents are incorporated herein by reference.

The following examples shall further illustrate the present invention without restricting the scope of this invention.

EXAMPLES

In table 1 the structural properties of the leveler examples are given. The polyalkylene-polyamine backbones of all tested levelers are in all cases polyethyleneimines from BASF. Used polyethyleneimines comprise about equal fractions of primary, secondary and tertiary amine groups. Thus, it was assumed, that one N—H unit of the polyethyleneimine backbone correlates with an average molecular weight of 43 g/mol. The molecular weights of the respective polymer backbones are given in the second column of table 1. The polyalkyleneimines according to examples 1-5 have been (poly)alkoxylated by ethylene oxide. The number of ethylene oxide units p per N—H unit of the respective polymer backbone is given in the third column. The leveler according to reference example 4 is only mono-ethoxylated (p=1). The Polyalkoxylated polyalkylenepolyamine according to example 3 has been functionalized additionally by quaternization of all nitrogen atoms using dimethyl sulfate (column 4, table 1). The last column summarizes which levelers provided defect-free filling performance (+) and which one disturbs the superfill mechanism (−). The filling experiments are described in detail in examples 12-17.

TABLE 1

| Example | M (polyamine backbone) [g/mol] | p | Functionalization |
|---|---|---|---|
| 1 | 2000 | 2 | None |
| 2 | 60000 | 2 | None |
| 3 | 60000 | 2 | N-methylated |
| 4 (comparative) | 60000 | 1 | None |
| 5 | 5000 | 5 | None |

The amine number was determined according to DIN 53176 by titration of a solution of the polymer in acetic acid with perchloric acid.

$^1$H NMR spectra were recorded with a 400 MHz spectrometer using the tetramethylsilane peak as internal standard.

Example 1

Polyethyleneimine Lupasol PR 8515 from BASF (652 g) and water (108.2 g) were placed into a 2 l autoclave at 80 degree C. and the reactor was purged with nitrogen three times at 2 bars. Then, ethylene oxide (600 g) was added in portions at 120 degree C. over a period of 5 h. To complete the reaction, the mixture was allowed to post-react for 4 h at the same temperature and, then, it was cooled down to 40 degree C. The reaction mixture was stripped with nitrogen at 60 degree C. and, subsequently, volatile compounds were removed at 60 degree C. and 200 mbar at the rotary evaporator. A yellow viscous liquid was observed as an intermediate product (1355 g) as an aqueous solution showing a water content of 7.6% by weight according to Karl-Fischer-titration and an amine number of 8.94 mmol/g.

The intermediate product (180 g), an aqueous solution of potassium hydroxide (concentration: 50 weight percent; 0.2 g) and water (30 ml) were homogenized in the microwave and, then, the mixture was placed into a 2 l autoclave. The reaction mixture was heated at 120 degree C. and purged with a constant nitrogen stream (0.5 m$^3$ N$_2$/h) for 2 h. Residual water was removed at below 10 mbar for 3 h. Subsequently, the reactor was purged with nitrogen three times at 5 bars. Then, ethylene oxide (77.9 g) was added in portions at 120 degree C. over a period of 1 h. To complete the reaction, the mixture was allowed to post-react for 6 h at the same temperature and, then, it was cooled down to 40 degree C. The reaction mixture was stripped with nitrogen and, subsequently, diluted with water (150 ml). Leveler L1 was observed as a dark brown aqueous solution (366.9 g) with a water content of 32.7% by weight according to Karl-Fischer-titration. $^1$H NMR (D2O): δ=3.72 (m, 6H, —CH2O—), 2.73 (m, 6H, —CH$_2$N—) ppm. Amine number: 4.64 mmol/g.

Example 2

Water-free hydroxyethylated polyethyleneimine Lupasol SC-61 B from BASF (100.5 g) was diluted with water and homogenized in the microwave to give an aqueous solution (150 ml). Then, potassium hydroxide (concentration: 50 weight percent; 0.4 g) was added and the mixture was stirred overnight. Then the solution was placed into a 2 l autoclave. The reaction mixture was heated at 120 degree C. and purged with a constant nitrogen stream (0.5 m$^3$ N2/h) for 2 h. Subsequently, the reactor was purged with nitrogen three times at 5 bars. Then, ethylene oxide (53.6 g) was added in portions at 120 degree C. over a period of 5 h. To complete the reaction, the mixture was allowed to post-react overnight at the same temperature. Volatile compounds were removed at the rotary evaporator at 100 degree C. at 1-3 mbars. The product was observed as a brown highly viscous liquid (154.9 g). $^1$H NMR (CDCl$_3$): δ=3.58 (m, 6H, —CH$_2$O—), 2.64 (m, 6H, —CH$_2$N—) ppm. Amine number: 7.0 mmol/g.

Example 3

The compound prepared by example 2 (20.0 g) and water (153 g) were placed into a 250 ml flask and dimethyl sulfate was added drop-wise into the solution at room temperature. The reaction mixture was stirred for 22 h at room temperature and heated for additional 6.5 h at 100° C. The resulting brown solution showed an amine number of 0 mmol/g, indicating complete quaternization of all amine atoms present in the polyalkoxylated polyethyleneimine starting material. The aqueous solution of the product showed a water content of 77.3%.

Comparative Example 4

Hydroxyethylated polyethyleneimine Lupasol SC-61 B available from BASF.

Example 5

Polyethyleneimine Lupasol G 100 from BASF (1001 g; water content: 50 weight percent) was placed into a 2 l autoclave at 80 degree C. The reaction mixture was heated at 100 degree C. and purged with a constant nitrogen stream (0.25 m$^3$ N$_2$/h) for 3 h. Then, ethylene oxide (460.8 g) was added in portions at 120 degree C. over a period of 5 h 10 min. To complete the reaction, the mixture was allowed to post-react for 2 h at the same temperature and, then, it was cooled down to 40 degree C. The reaction mixture was stripped with nitrogen at 80 degree C. and, subsequently, volatile compounds were removed at 60 degree C. and 200 mbar at the rotary evaporator. A yellow viscous liquid was observed as an intermediate product (1360 g) as an aqueous solution, showing a water content of 31%.

The intermediate product (70.7 g), an aqueous solution of potassium hydroxide (concentration: 50 weight percent; 0.2 g) and water (10 g) were placed into a 2l autoclave. The reactor was purged with nitrogen three times at 5 bars at 120 degree C. Then, the reaction mixture was purged with a constant nitrogen stream (0.5 m$^3$ N$_2$/h) for 1 h. Residual amounts of water were removed in vacuo (below 10 mbar) for additional 2 h. Again, the reactor was purged with nitrogen three times at 5 bars at 120 degree C. Then, ethylene oxide (106.7 g) was added in portions at 120 degree C. over a period of 10 h. To complete the reaction, the mixture was allowed to post-react overnight at the same temperature. After cooling to room temperature water was added. Volatile organic compounds were removed at the rotary evaporator. The final product was observed as a dark brown aqueous solution (141.1 g) with a water content of 32.8%. Amine number: 2.60 mmol/g. $^1$H NMR (D20): δ=3.72 (m, 18H, —CH$_2$O—), 2.73 (m, 6H, —CH$_2$N—) ppm.

Comparative Example 6

A copper plating bath was prepared by combining 40 g/l copper as copper sulfate, 10 g/l sulfuric acid, 0.050 g/l chloride ion as HCl, 0.100 g/l of an EO/PO copolymer suppressor, and 0.028 g/l of SPS and DI water. The EO/PO copolymer suppressor had a molecular weight of below 5000 g/mole and terminal hydroxyl groups.

A copper layer was electroplated onto a structured silicon wafer purchased from SKW Associate Inc. containing grooves, so called trenches. These lines varied in width ranging from 130 nm to several microns with a depth of approximately 250 nm and a separation ranging from 130 nm to several microns. Such wafer substrates were brought into contact with the above described plating bath at 25 degrees C. and a direct current of −5 mA/cm$^2$ for 120 s followed by −10 mA/cm$^2$ for 60 s was applied.

The thus electroplated copper layer was investigated by profilometry inspection with a Dektak 3, Veeco Instruments Inc. In the case of 130 nm feature sizes a field of wires was scanned and the height difference between the unstructured and structured area was measured.

The results using a plating bath without a leveling agent are shown in FIG. 4a

Example 7

The procedure of example 6 was repeated except that 1 ml/l of an aqueous stock solution containing 1% by weight of the active leveling agent of example 1 was added to the plating bath.

A copper layer was electroplated onto a wafer substrate as described in example 6. The thus electroplated copper layer was investigated by profilometry as described in example 6.

The results using a plating bath with a leveling agent according to the present invention are shown in FIG. 4b. The profilometry cross-sectional scan of trenches having 0.130 micrometers width with a separation of 0.130 micrometers (FIG. 4b), shows a significant reduction of the mounding compared to prior art (FIG. 4a). The measured values are depicted in table 2.

Example 8

The procedure of example 6 was repeated except that 1 ml/l of an aqueous stock solution containing 1% by weight of the active leveling agent of example 2 was added to the plating bath.

A copper layer was electroplated onto a wafer substrate as described in example 6. The thus electroplated copper layer was investigated by profilometry as described in example 6.

The values obtained from profilometry, as depicted in table 2, show a significant reduction of the mounding compared to example 6 without a leveling agent.

Example 9

The procedure of example 6 was repeated except that 1 ml/l of an aqueous stock solution containing 1% by weight of the active leveling agent of example 3 was added to the plating bath.

A copper layer was electroplated onto a wafer substrate as described in example 6. The thus electroplated copper layer was investigated by profilometry as described in example 6.

The values obtained from profilometry, as depicted in table 2, show a significant reduction of the mounding compared to example 6 without a leveling agent.

Example 10

The procedure of example 6 was repeated except that 1 ml/l of an aqueous stock solution containing 1% by weight of the active leveling agent of example 4 was added to the plating bath.

A copper layer was electroplated onto a wafer substrate as described in example 6. The thus electroplated copper layer was investigated by profilometry as described in example 6.

The values obtained from profilometry, as depicted in table 2, show a significant reduction of the mounding compared to example 6 without a leveling agent.

Example 11

The procedure of example 6 was repeated except that 1 ml/l of an aqueous stock solution containing 1% by weight of the active leveling agent of example 5 was added to the plating bath.

A copper layer was electroplated onto a wafer substrate as described in example 6. The thus electroplated copper layer was investigated by profilometry as described in example 6.

The values obtained from profilometry, as depicted in table 2, show a significant reduction of the mounding compared to example 6 without a leveling agent.

For FIB/SEM investigations about the influence of the polyethyleneimines according to the present invention on the fill performance in sub 50 nanometer features as shown in FIG. 3 were used for electroplating with the different plating baths described in the following sections. Thus the used copper seeded wafer substrate exhibited feature sizes of 15.6 to 17.9 nanometer width at the trench opening, 34.6 to 36.8 nanometer width at half height of the trench, and 176.4 nanometer depth.

Comparative Example 12

A plating bath was prepared by combining DI water, 40 g/l copper as copper sulfate, 10 g/l sulfuric acid, 0.050 g/l chloride ion as HCl, 0.028 g/l of SPS and 2.00 ml/l of a 5.3% by weight solution in DI water of a EO/PO copolymer suppressor having a molecular weight $M_w$ of below 13000 g/mole and terminal hydroxyl groups.

A copper layer was electroplated onto a wafer substrate with feature sizes shown in FIG. 3 provided with a copper seed layer by contacting the wafer substrate with the above described plating bath at 25 degrees C. applying a direct current of −5 mA/cm² for 3 s. The thus electroplated copper layer was cross-sectioned and investigated by SEM inspection.

The result is shown in FIG. 5, providing the SEM image of the filled trenches without exhibiting any defects like voids or seams. The bottom up fill is clearly shown since the trenches are filled up to just underneath the trench opening.

Example 13

The procedure of example 12 was repeated except that in addition 0.625 ml/l of a 1% by weight aqueous solution of a polyethyleneimine from example 1 was added to the plating bath.

The result using a plating bath with the leveling agent as prepared in example 1 according to the present invention is shown in FIG. 6. The trenches are filled without exhibiting any defects like voids or seams thus showing that there is not any interference in the gap filling by the leveling agent.

Example 14

The procedure of example 12 was repeated except that in addition 0.625 ml/l of a 1% by weight aqueous solution of a polyethyleneimine from example 2 was added to the plating bath.

The result using a plating bath with the leveling agent as prepared in example 2 according to the present invention is shown in FIG. 7. The trenches are filled without exhibiting any defects like voids or seams thus showing that there is not any interference in the gap filling by the leveling agent.

Example 15

The procedure of example 12 was repeated except that in addition 0.625 ml/l of a 1% by weight aqueous solution of a polyethyleneimine from example 3 was added to the plating bath.

The result using a plating bath with the leveling agent as prepared in example 3 according to the present invention is shown in FIG. 8. The trenches are filled without exhibiting any defects like voids or seams thus showing that there is not any interference in the gap filling by the leveling agent.

Comparative example 16

The procedure of example 12 was repeated except that in addition 0.625 ml/l of a 1% by weight aqueous solution of a polyethyleneimine from example 4 was added to the plating bath.

The result using a plating bath with the leveling agent as prepared in example 4 is shown in FIG. 9. The filled trenches show void formation. This indicates that the leveler strongly interferes in the gap filling.

Example 17

The procedure of example 12 was repeated except that in addition 0.625 ml/l of a 1% by weight aqueous solution of a polyethyleneimine from example 5 was added to the plating bath. The result using a plating bath with the leveling agent as prepared in example 5 according to the present invention is shown in FIG. 10. The trenches are filled without exhibiting any defects like voids or seams thus showing that there is not any interference in the gap filling by the leveling agent.

TABLE 2

| Example | Leveler | mounding | filling performance |
| --- | --- | --- | --- |
| comparative 6/12 | none | 370 nm (FIG. 4a) | + (FIG. 5) |
| 7/13 | Example 1 | −28 nm (FIG. 4b) | + (FIG. 6) |
| 8/14 | Example 2 | 39 nm | + (FIG. 7) |
| 9/15 | Example 3 | 48 nm | + (FIG. 8) |
| comparative 10/16 | comparative Example 4 | 19 nm | − (FIG. 9) |
| 11/17 | Example 5 | 192 nm | + (FIG. 10) |

The invention claimed is:

1. A composition, comprising:
   a metal ion source;
   an acidic electrolyte; and
   an additive comprising a polyalkyleneimine backbone,
   wherein the polyalkyleneimine backbone has a weight average molecular weight $M_w$ of from 300 g/mol to 1,000,000 g/mol,
   a hydrogen atom bonded to a nitrogen atom in the backbone is substituted by a polyoxyalkylene radical, and
   an average number of oxyalkylene units in the polyoxyalkylene radical is from 1.5 to 10 per N—H unit.

2. The composition of claim 1, wherein the average number of oxyalkylene units in the polyoxyalkylene radical is from 2 to 8 per N—H unit.

3. The composition of claim 1, wherein the additive is a polyalkyleneimine of formula L1:

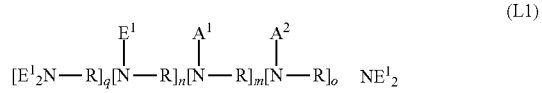

(L1)

or a derivative thereof obtained by a process comprising protonating or quaternizing the polyalkyleneimine,
R is a linear $C_2$-$C_6$ alkanediyl, a branched $C_3$-$C_6$ alkanediyl, or a mixture thereof,
$A^1$ is a continuation of the polyalkyleneimine backbone by branching,
$A^2$ is alkyl, alkenyl, alkynyl, alkaryl, or a mixture thereof,
$E^1$ is a polyoxyalkylene unit of formula —$(R^1O)_p R^2$,
each $R^1$ is independently ethanediyl, 1,2-propanediyl, (2-hydroxymethyl)ethanediyl, 1,2-butanediyl, 2,3-butanediyl, 2-methyl-1,2-propanediyl (isobutylene), 1-pentanediyl, 2,3-pentanediyl, 2-methyl-1,2-butanediyl, 3-methyl-1,2-butanediyl, 2,3-hexanediyl, 3,4- hexanediyl, 2-methyl-1,2-pentanediyl, 2-ethyl-1,2-butanediyl, 3-methyl-1,2-pentanediyl, 1,2-decanediyl, 4-methyl-1,2-pentanediyl, (2-phenyl)ethanediyl, or a mixture thereof, each $R^2$ is independently hydrogen, alkyl, alkenyl, alkynyl, alkaryl, aryl, or a mixture thereof, p is from 1.5 to 10, q, n, m, and o are non-negative integers and q+n+m+o is from 10 to 24,000.

4. The composition of claim 3, wherein R is ethanediyl or a combination of ethanediyl and 1,2-propanediyl.

5. The composition of claim 3, wherein $R^1$ is ethanediyl or a combination of ethanediyl and 1,2-propanediyl.

6. The composition of claim 3, wherein $R^2$ is hydrogen.

7. The composition of claim 3, wherein p is from 2 to 5.

8. The composition of claim 3, wherein q+n+m+o is from 15 to 10000.

9. The composition of claim 3, wherein q+n+m+o is from 25 to 65.

10. The composition of claim 3, wherein o is 0.

11. The composition of claim 1, wherein the metal ion source comprises a copper ion.

12. The composition of claim 1, further comprising an accelerating agent.

13. The composition of claim 1, further comprising a suppressing agent.

14. A process for depositing a metal layer on a substrate, the process comprising:
  contacting a metal plating bath comprising the composition of claim 1 with the substrate, and
  applying a current density to the substrate for a time sufficient to deposit the metal layer onto the substrate.

15. A process for depositing a metal layer on a substrate, the process comprising:
  contacting a metal plating bath comprising:
  a metal ion source;
  an acidic electrolyte; and
  an additive comprising a polyalkyleneimine backbone,
  wherein the polyalkyleneimine backbone has a weight average molecular weight $M_w$ of from 300 g/mol to 1,000,000 g/mol,
  a hydrogen atom bonded to a nitrogen atom in the backbone is substituted by a polyoxyalkylene radical, and
  an average number of oxyalkylene units in the polyoxyalkylene radical is from 1.5 to 10 per N—H unit with the substrate, and
  applying a current density to the substrate for a time sufficient to deposit the metal layer onto the substrate,
  wherein the substrate comprises a micrometer or submicrometer sized feature and
  applying the current density to deposit the metal layer comprises depositing to fill the micrometer or submicrometer sized feature.

16. The process of claim 15, wherein the micrometer or submicrometer-sized feature has a size from 1 to 1000 nm, an aspect ratio of 4 or more, or both.

17. The composition of claim 7, wherein p is from 2 to 3.

18. The composition of claim 8, wherein q+n+m+o is from 20 to 5000.

19. The composition of claim 3, wherein q+n+m+o is from 1000 to 1800.

20. The process of claim 14,
  wherein the additive is a polyalkyleneimine of formula L1:

$$[E^1_2N-R]_q[N-R]_n[N-R]_m[N-R]_o \ NE^1_2 \quad \overset{E^1}{|} \quad \overset{A^1}{|} \quad \overset{A^2}{|} \tag{L1}$$

or a derivative thereof obtained by a process comprising protonating or quaternzing the polyalkyleneimine, each R is independently a linear $C_2$-$C_6$ alkanediyl, a branched $C_3$-$C_6$ alkanediyl, or a mixture thereof, $A^1$ is a continuation of the polyalkyleneimine backbone by branching, each $A^2$ is independently alkyl, alkenyl, alkynyl, alkaryl, or a mixture thereof, $E^1$ is a polyoxyalkylene unit of formula $-(R^1O)_pR^2$, each $R^1$ is independently ethanediyl, 1,2-propanediyl, (2-hydroxymethyl)ethanediyl, 1,2-butanediyl, 2,3-butanediyl, 2-methyl-1,2-propanediyl (isobutylene), 1-pentanediyl, 2,3-pentanediyl, 2-methyl-1,2-butanediyl, 3-methyl-1,2-butanediyl, 2,3-hexanediyl, 3,4-hexanediyl, 2-methyl-1,2-pentanediyl, 2-ethyl-1,2-butanediyl, 3-methyl-1,2-pentanediyl, 1,2-decanediyl, 4-methyl-1,2-pentanediyl and (2-phenyl)ethanediyl, or a mixture thereof, each $R^2$ is independently hydrogen, alkyl, alkenyl, alkynyl, alkaryl, aryl, or a mixture thereof, p is from 1.5 to 10, q, n, m, o are non-negative integers and a sum q+n+m+o is from 10 to 24,000.

21. The composition of claim 1, wherein said acidic electrolyte is at least one acidic electrolyte selected from the group consisting of sulfuric acid, acetic acid, fluoroboric acid, methanesulfonic acid, ethanesulfonic acid, propanesulfonic acid, trifluoromethane sulfonic acid, phenyl sulfonic acid, toluenesulfonic acid, sulfamic acid, hydrochloric acid and phosphoric acid.

22. The composition of claim 1, wherein said acidic electrolyte is present in an amount of 1 to 300 g/L.

23. The composition according to claim 1, wherein said polyalkyleneimine backbone has a weight average molecular weight Mw of from 600 g/mol to 1,000,000 g/mol.

24. The composition according to claim 1, wherein said polyalkyleneimine backbone has a weight average molecular weight Mw of from 1,000 g/mol to 1,000,000 g/mol.

25. The composition according to claim 3, where o is 0.

26. The process according to claim 20, where o is 0.

27. The composition according to claim 3, where $A^2$ is an alkyl which is methyl.

28. The process according to claim 20, where $A^2$ is an alkyl which is methyl.

* * * * *